(12) United States Patent
Owen

(10) Patent No.: US 9,227,688 B1
(45) Date of Patent: Jan. 5, 2016

(54) KICK SCOOTER HAVING A STEERING CONTROL

(71) Applicant: Neil Owen, Dongguan (CN)

(72) Inventor: Neil Owen, Dongguan (CN)

( * ) Notice: Subject to any disclaimer, the term of this patent is extended or adjusted under 35 U.S.C. 154(b) by 0 days.

(21) Appl. No.: 14/856,581

(22) Filed: Sep. 17, 2015

(30) Foreign Application Priority Data

Sep. 25, 2014 (CN) ...................... 2014 2 0557280 U

(51) Int. Cl.
*B62M 1/00* (2010.01)
*B62K 21/08* (2006.01)
*B62K 3/00* (2006.01)

(52) U.S. Cl.
CPC ................. *B62K 21/08* (2013.01); *B62K 3/002* (2013.01)

(58) Field of Classification Search
CPC ........... B62K 3/02; B62K 21/00; B62K 21/10
See application file for complete search history.

(56) References Cited

U.S. PATENT DOCUMENTS

| | | | | |
|---|---|---|---|---|
| 6,142,493 A * | 11/2000 | Wang | ...................... | B62K 3/002 280/11.233 |
| 7,954,831 B1 * | 6/2011 | Yeh | ........................ | B62K 3/002 16/429 |
| 2002/0089139 A1 * | 7/2002 | Reynolds | ............... | B62K 3/002 280/87.041 |

* cited by examiner

*Primary Examiner* — Bryan Evans

(57) ABSTRACT

A kick scooter includes a deck including a through hole in a hole, a flexible protruding member formed on the through hole, and a head tube having a through aperture; a steering tube including an aperture; a lock assembly including a projection having two parallel grooves, and a push button; a spring biased detent for fastening the steering tube and the deck together; and a steering control including a connecting member having a cavity; two pivotal members each having an end secured to a front wheel, and a bearing in a through hole; two cylinders each in either end of the connecting member and another through hole; and a biasing member biased between the cylinders. The steering control is unlocked with the protruding member in one groove and the pivotal members configured to pivot about the bearings. A pressing of the push button locks the connecting member.

1 Claim, 9 Drawing Sheets

KICK SCOOTER HAVING A STEERING CONTROL

BACKGROUND OF THE INVENTION

1. Field of the Invention

The invention relates to kick scooters and more particularly to a kick scooter having an improved steering control.

2. Description of Related Art

A conventional kick scooter comprises a handlebar, a steering control at a bottom of the handlebar and in front of a deck, and a lock on the deck. A rider may press the lock to unlock the steering control. Further, the rider may turn the front wheels by leaning to either side.

However, the lock is subject to malfunction due to spring fatigue over time.

Thus, the need for improvement still exists.

SUMMARY OF THE INVENTION

It is therefore one object of the invention to provide a kick scooter comprising a deck including a hole in a front end, a through hole in the hole, a flexible protruding member formed on the through hole, two bossed holes formed on a bottom of the front end, and a head tube disposed rearward of the hole and having a through aperture; a rear wheel rotatably connected to the deck; a steering tube including an aperture; a handlebar telescopically secured to in a steering tube; a lock assembly including a projection disposed in the through hole and having two parallel grooves, and a push button disposed on the hole; a plurality of steps formed on an inner surface of the head tube; a plurality of recesses formed on a bottom edge of the steering tube and disposed on the steps; a detent including a projecting member at a first end, the projecting member projecting out of the aperture, a support block at a second end, the support block engaging an inner surface of the steering tube, and an elastic member interconnecting the projecting member and the support block wherein the projecting member further projects out of the through aperture to fasten the steering tube and the deck together; and a steering control including a connecting member having a cavity; two pivotal members each having a first end secured to a center part of a front wheel, each pivotal member having a first through hole, a second through hole at a second end, and a bearing put on the bossed hole and disposed in the first through hole; two cylinders each disposed in either end of the connecting member and the second through hole; and a biasing member biased between the cylinders; wherein the steering control is unlocked with the protruding member disposed in one groove and the pivotal members configured to pivot about the bearings in a default mode; and wherein a pressing of the push button causes the protruding member to clear one groove to enter the other groove, and causes the projection to enter the cavity to lock the connecting member.

The above and other objects, features and advantages of the invention will become apparent from the following detailed description taken with the accompanying drawings.

DETAILED DESCRIPTION OF THE INVENTION

Figure 1:
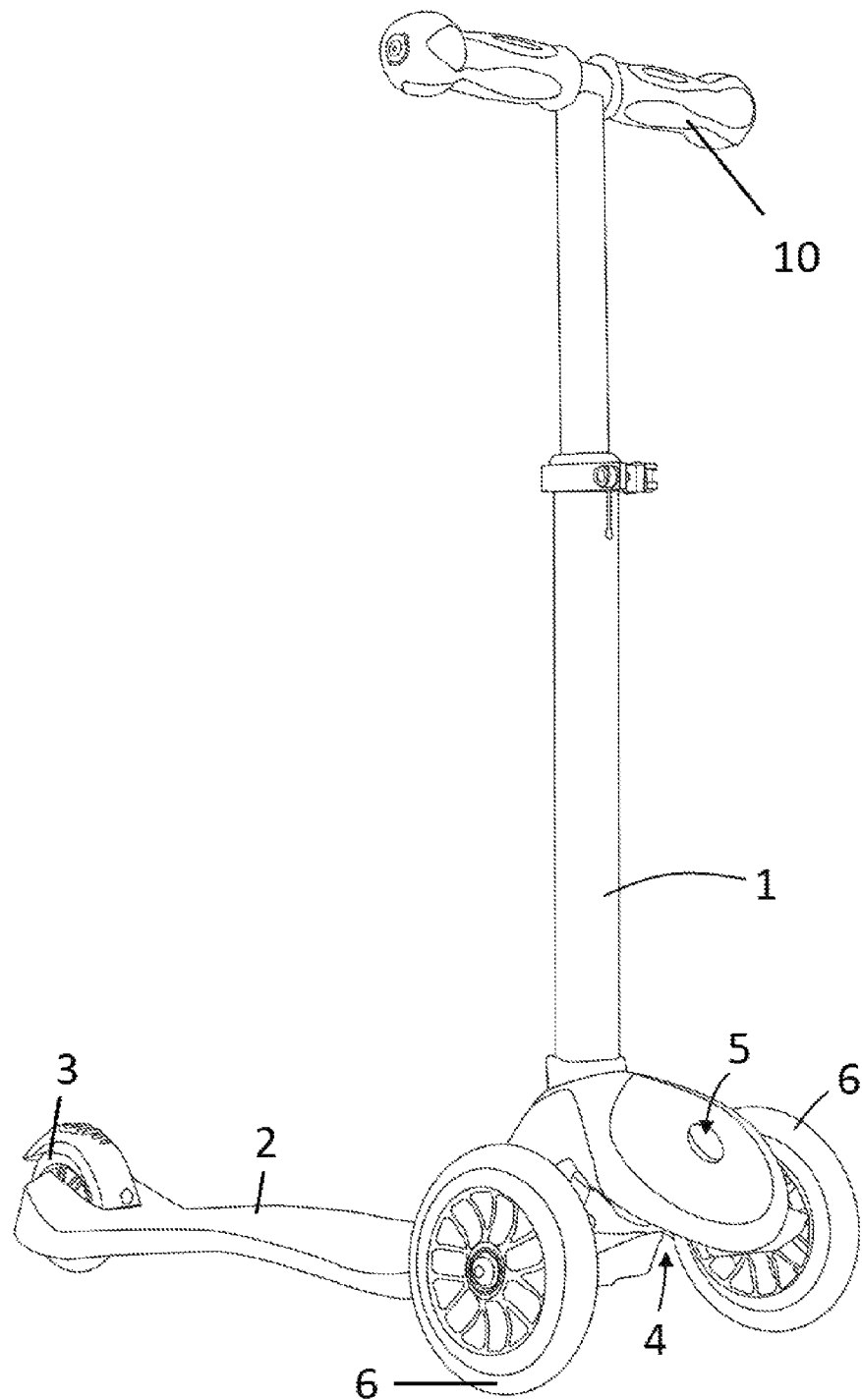
FIG. 1 is a perspective view of a kick scooter according to the invention.
Figure 2:
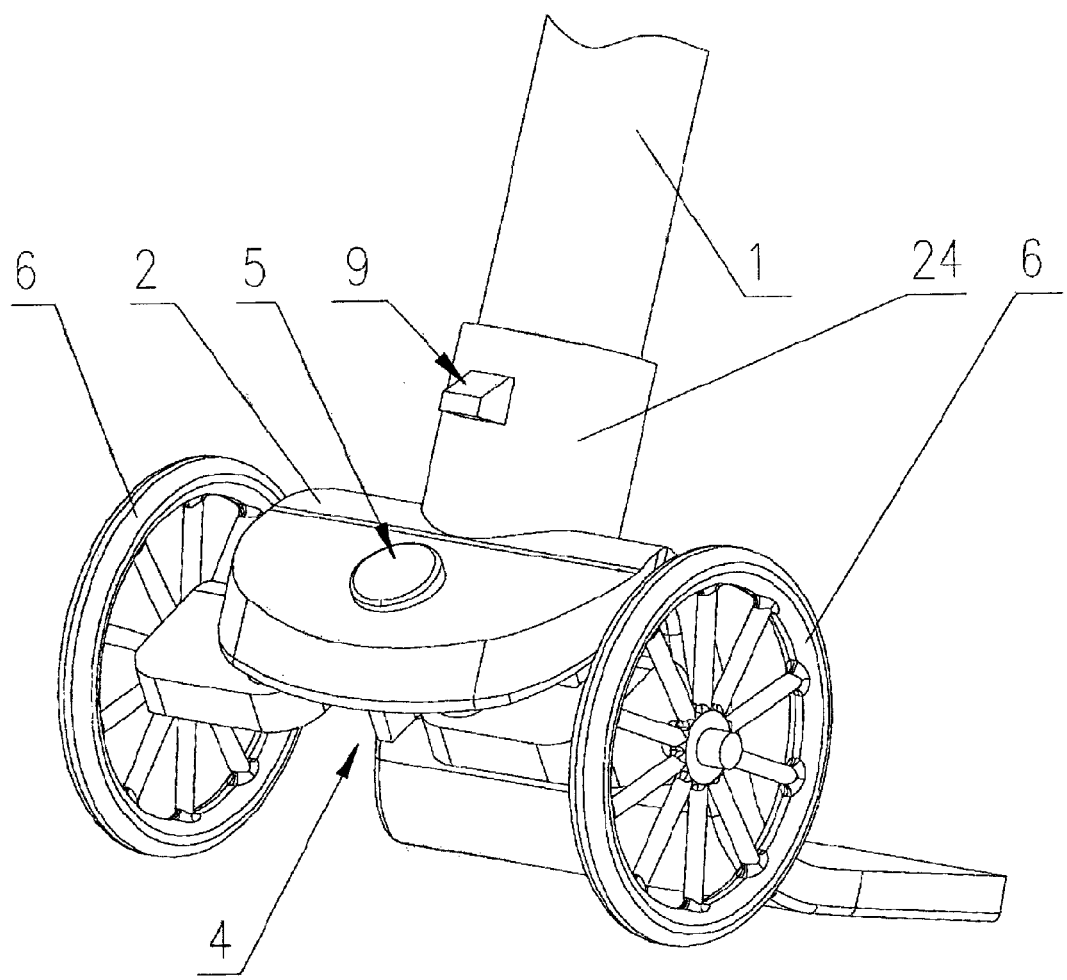
FIG. 2 is a perspective view of a lower portion of FIG. 1.
Figure 3:
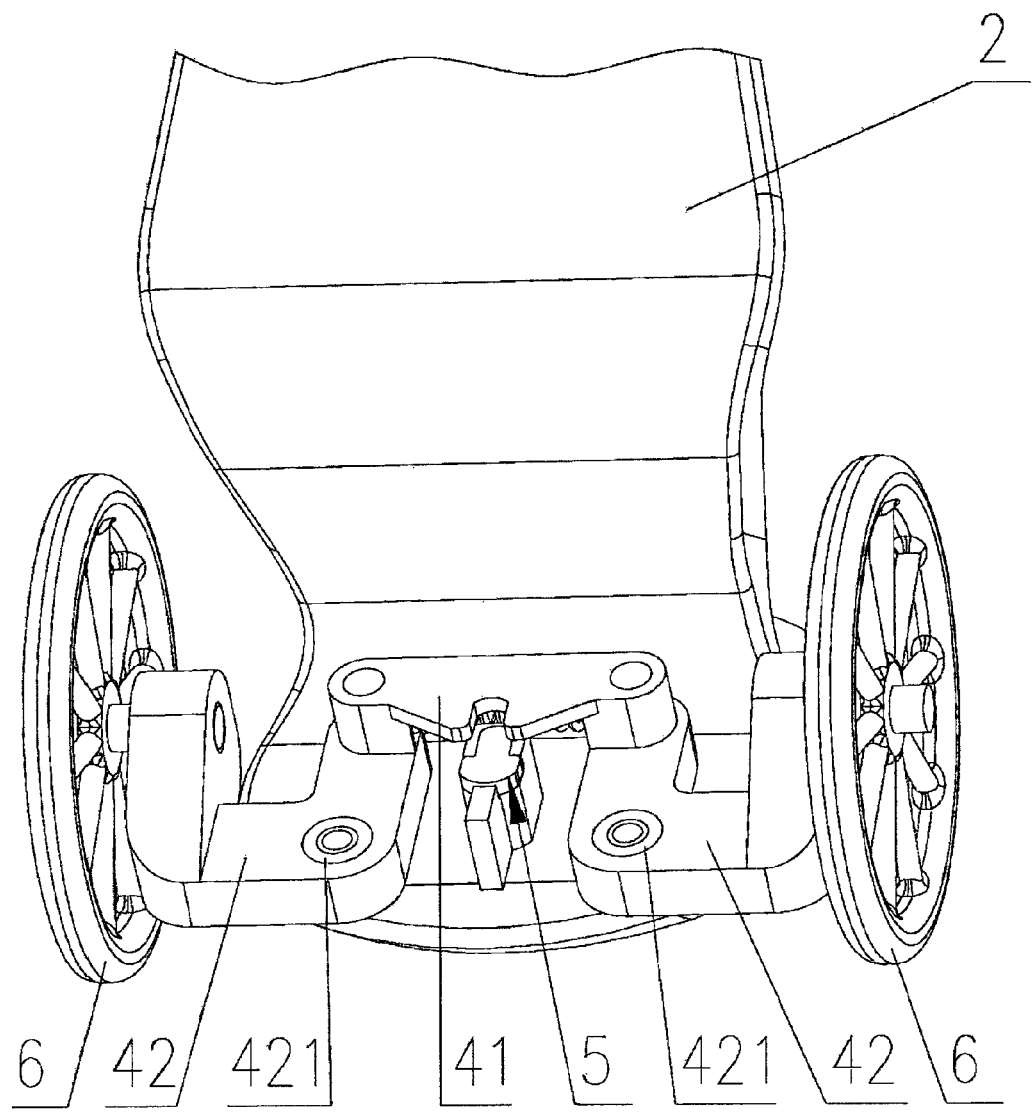
FIG. 3 is another view of FIG. 2.
Figure 4:
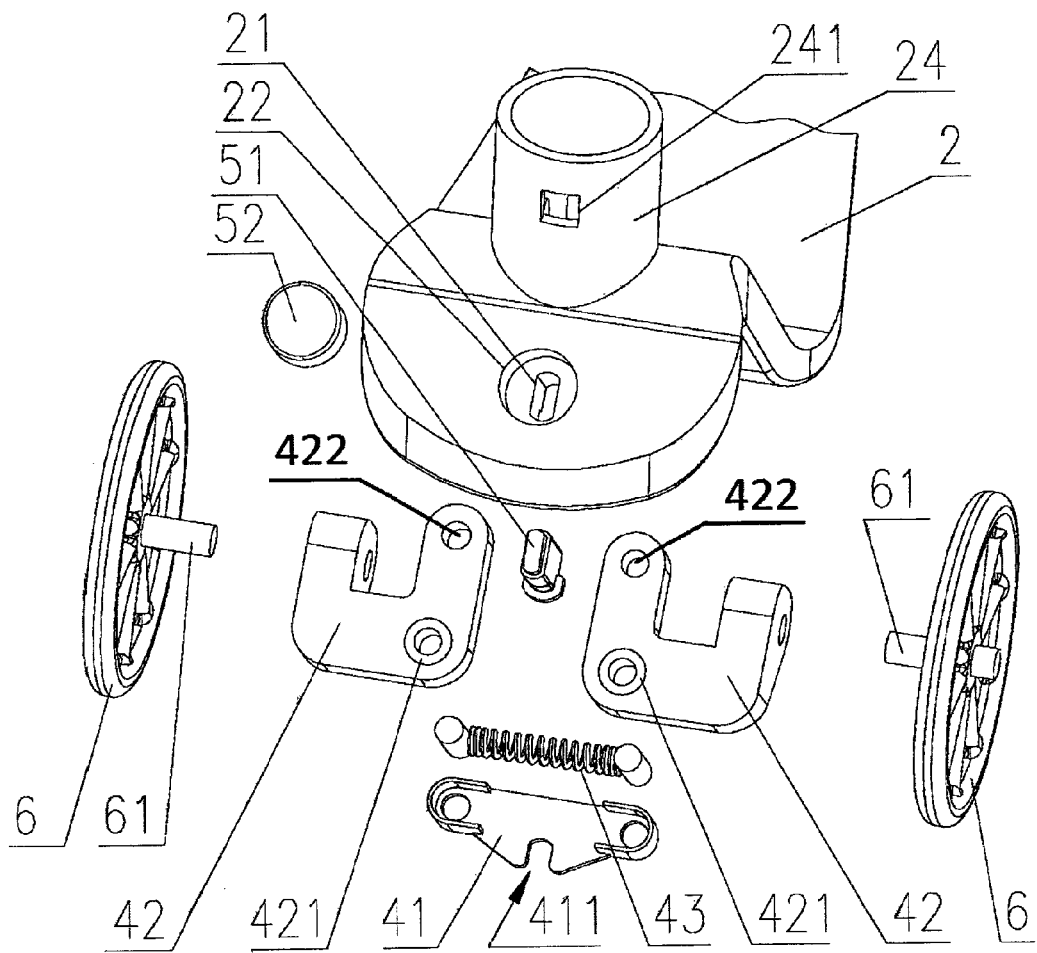
FIG. 4 is an exploded view of FIG. 2.
Figure 5:
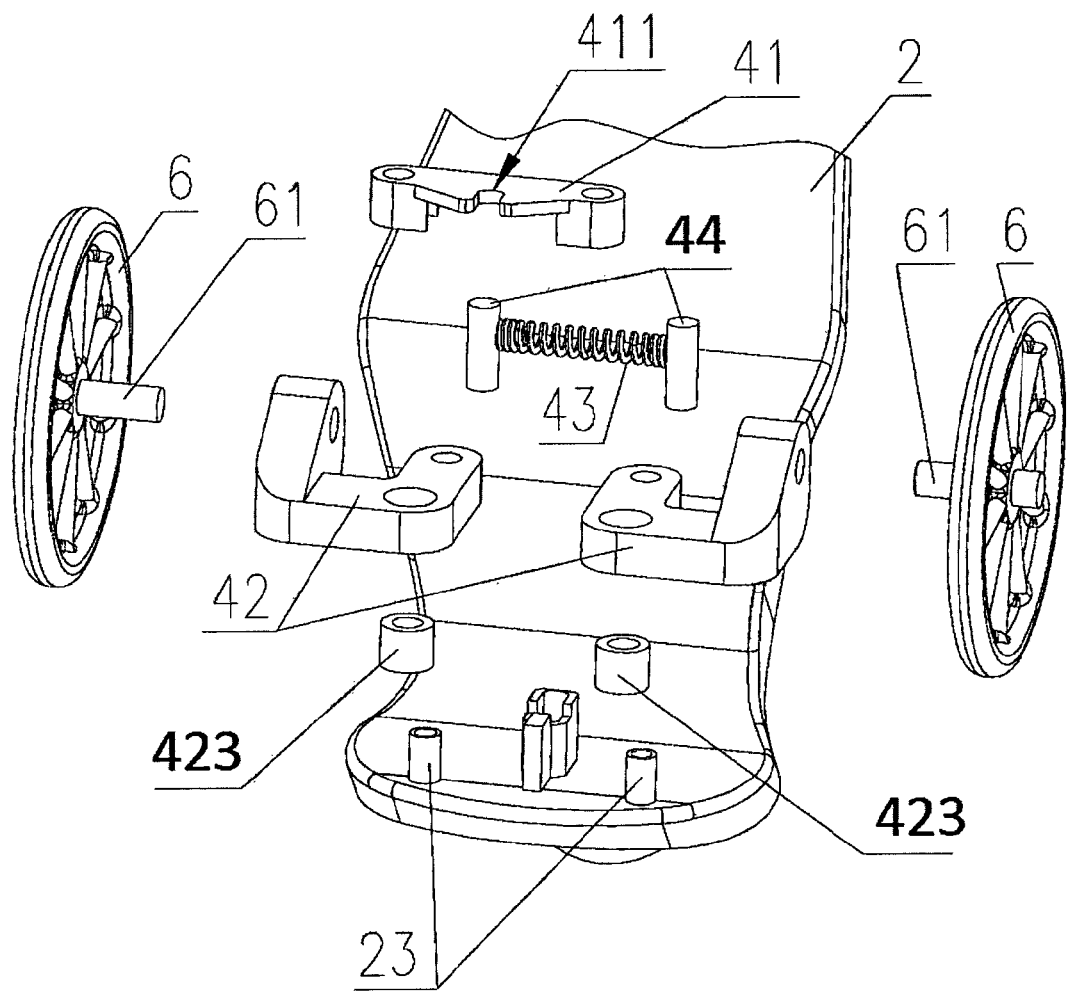
FIG. 5 is an exploded view of FIG. 3.
Figure 6:
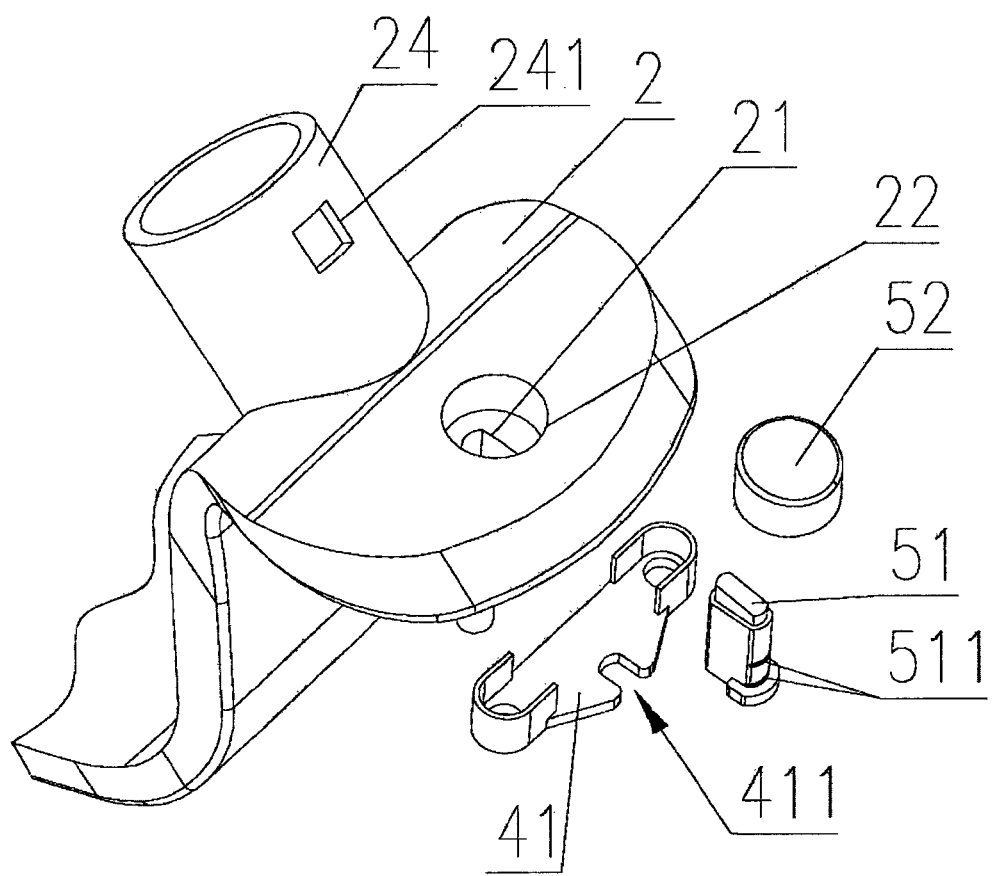
FIG. 6 is an exploded view of the steering control and other associated components.
Figure 7:
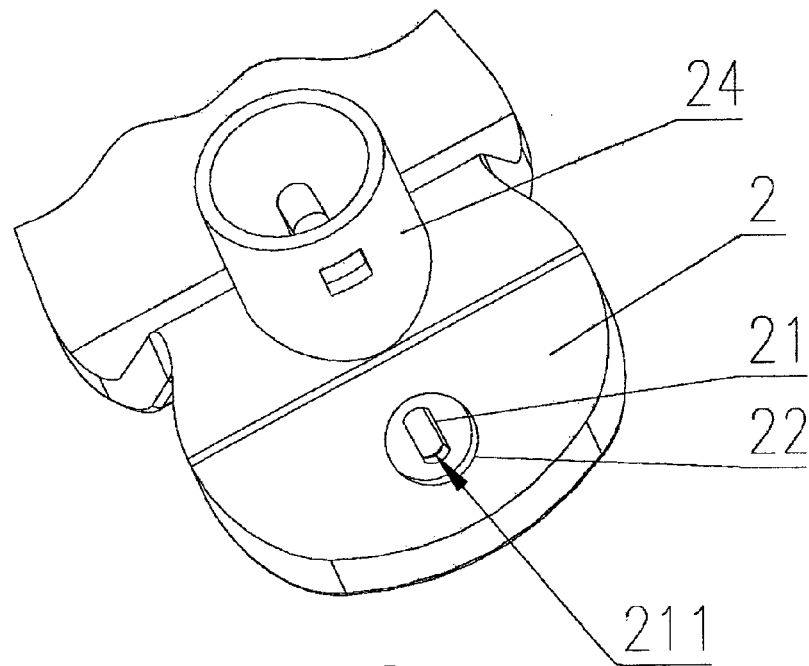
FIG. 7 is a perspective view of the deck.
Figure 8A:
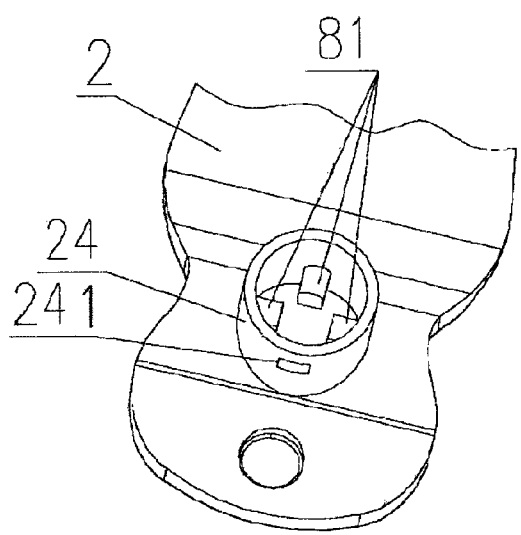
FIG. 8A is a perspective view of the steps formed on an inner surface of the head tube.
Figure 8B:
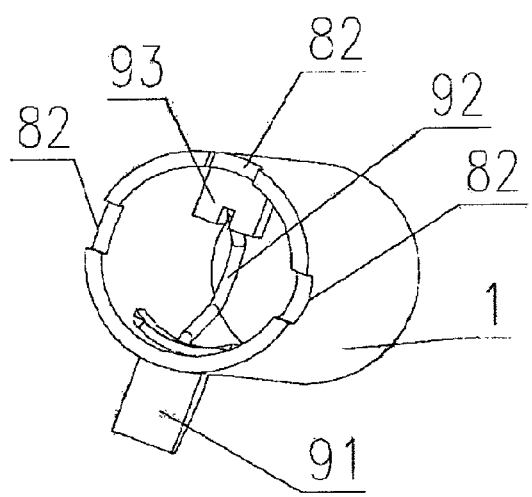
FIG. 8B is a perspective view of the detent mounted in the steering tube.
Figure 9:
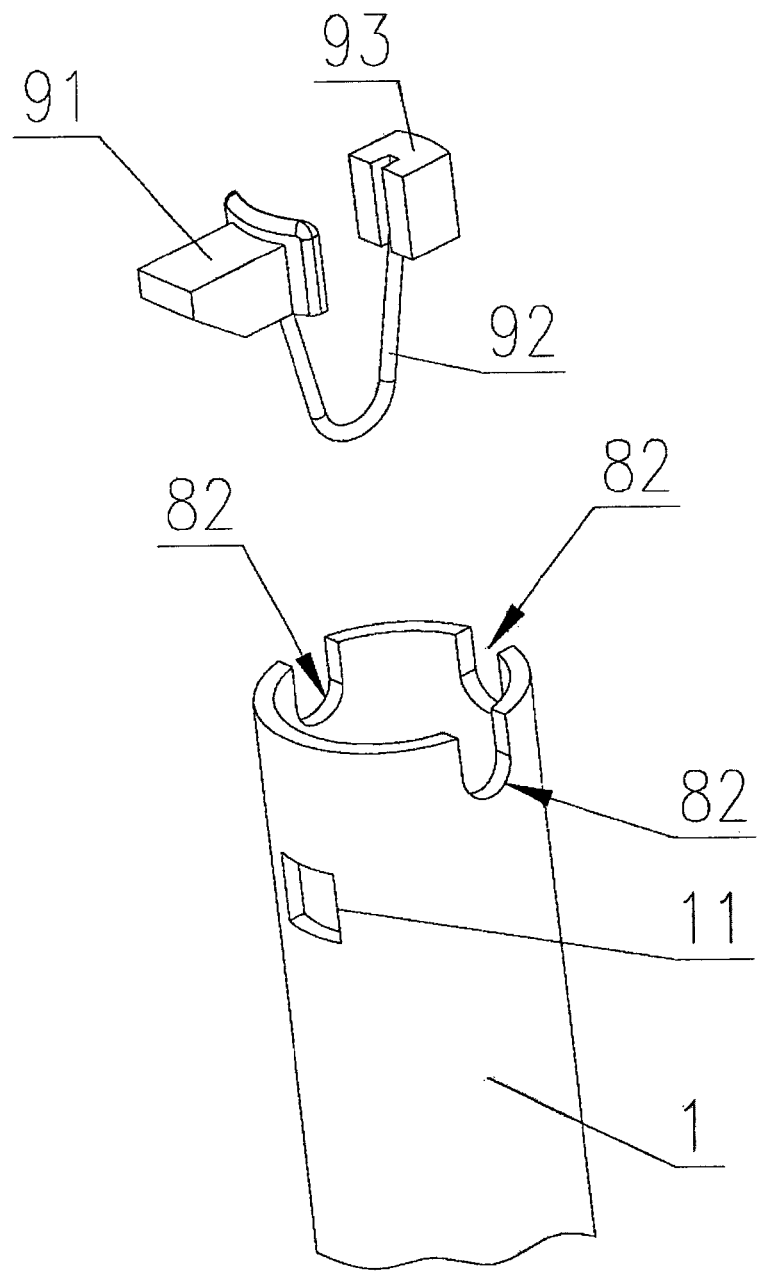
FIG. 9 is a perspective view showing the detent to be disposed in the steering tube.
Figure 10A:
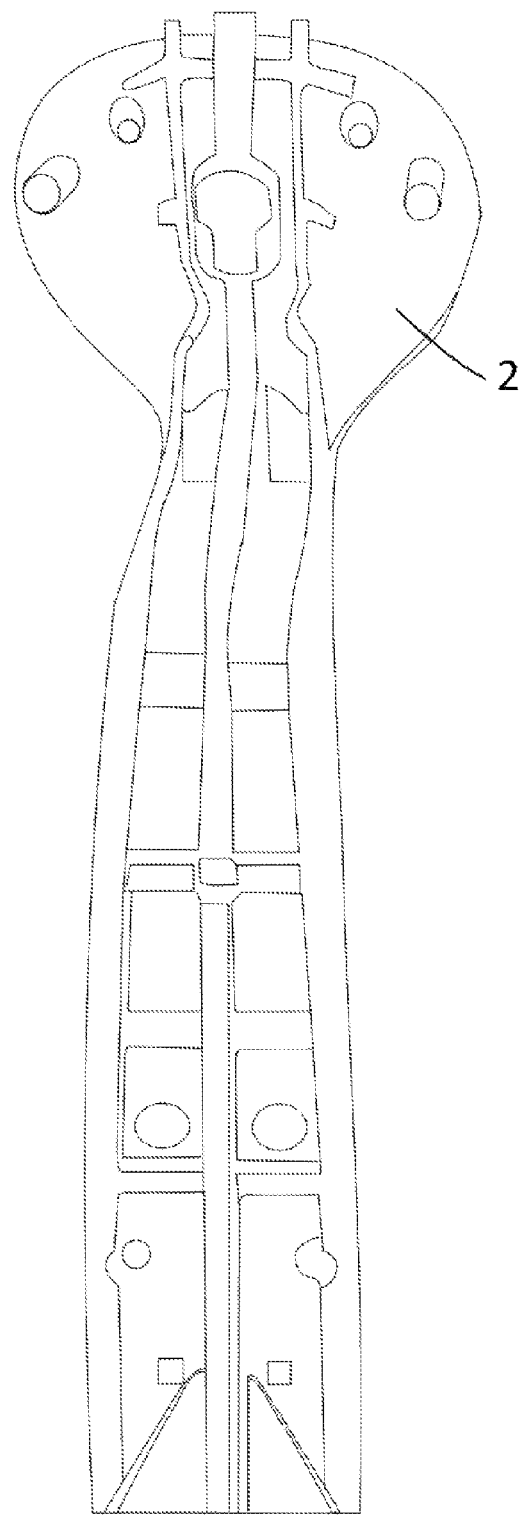
FIG. 10A is a bottom view of the deck.
Figure 10B:
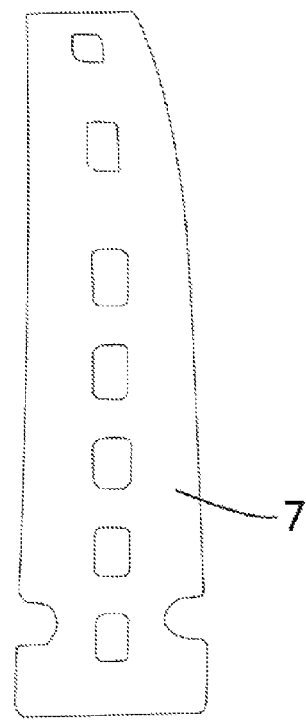
FIG. 10B is a top view of a strengthening plate disposed in the deck.

Referring to FIGS. 1 to 10B, a kick scooter of the invention comprises the following components as discussed in detail below.

A handlebar 10 is telescopically secured to a steering tube 1. The steering tube 1 includes an aperture 11 on a lower portion. The deck 2 includes a hole 22 in a front end, a through hole 21 in the hole 22, a flexible protruding member 211 on the through hole 21, two bossed holes 23 on a bottom of the front end, and a head tube 24 disposed rearward of the hole 22 and having a through aperture 241. A rear wheel 3 is rotatably connected to a rear end of the deck 2. A lock assembly 5 includes a projection 51 disposed in the through hole 21 and having two parallel grooves 511, and a push button 52 disposed on the hole 22. Three steps 81 are formed on an inner surface of the head tube 24. Three recesses 82 are formed on a bottom edge of the steering tube 1 and disposed on the steps 81. A detent 9 includes a projecting member 91 at one end, the projecting member 91 projecting out of the aperture 11, a support block 93 at the other end, the support block 93 engaging an inner surface of the steering tube 1, and an elastic member 92 interconnecting the projecting member 91 and the support block 93. The projecting member 91 projects out of the through aperture 241 to fasten the steering tube 1 and the deck 2 together. A steering control 4 includes a connecting member 41 having an intermediate cavity 411; two pivotal members 42 each having one end secured to a hub 61 of a front wheel 6, the pivotal member 42 having a first through hole 421, a second through hole 422 at the other end, and a bearing 423 put on the bossed hole 23 and disposed in the first through hole 421; two cylinders 44 each disposed in either end of the connecting member 41 and the second through hole 422; and a helical spring 43 biased between the cylinders 44. A strengthening plate 7 is provided in the deck 2 for increasing the structural strength of the deck 2.

The steering control 4 is unlocked with the protruding member 211 disposed in the upper groove 511 and the pivotal member 42 may pivot about the bearing 423 in a default mode. For changing the riding direction, a rider may turn the handlebar 10 to pivot the steering control 4 which in turn pivots the front wheels 6.

To the contrary, the rider may press the push button 52 to move the grooves 511 until the protruding member 211 enters the lower groove 511. As such, the projection 51 enters the cavity 411 to lock the connecting member 41, thereby locking the steering control 4 and preventing the handlebar 10 from turning.

While the invention has been described in terms of preferred embodiments, those skilled in the art will recognize that the invention can be practiced with modifications within the spirit and scope of the appended claims.

What is claimed is:

1. A kick scooter comprising:

a deck including a hole in a front end, a through hole in the hole, a flexible protruding member formed on the through hole, two bossed holes formed on a bottom of the front end, and a head tube disposed rearward of the hole and having a through aperture;

a rear wheel rotatably connected to the deck;

a steering tube including an aperture;

a handlebar telescopically secured to in a steering tube;

a lock assembly including a projection disposed in the through hole and having two parallel grooves, and a push button disposed on the hole;

a plurality of steps formed on an inner surface of the head tube;

a plurality of recesses formed on a bottom edge of the steering tube and disposed on the steps;

a detent including a projecting member at a first end, the projecting member projecting out of the aperture, a support block at a second end, the support block engaging an inner surface of the steering tube, and an elastic member interconnecting the projecting member and the support block wherein the projecting member further projects out of the through aperture to fasten the steering tube and the deck together; and a steering control including a connecting member having a cavity; two pivotal members each having a first end secured to a center part of a front wheel, each pivotal member having a first through hole, a second through hole at a second end, and a bearing put on the bossed hole and disposed in the first through hole; two cylinders each disposed in either end of the connecting member and the second through hole; and a biasing member biased between the cylinders;

wherein the steering control is unlocked with the protruding member disposed in one groove and the pivotal members configured to pivot about the bearings in a default mode; and wherein a pressing of the push button causes the protruding member to clear one groove to enter the other groove, and causes the projection to enter the cavity to lock the connecting member.

* * * * *